US012543173B2

(12) United States Patent
Park et al.

(10) Patent No.: US 12,543,173 B2
(45) Date of Patent: Feb. 3, 2026

(54) METHOD AND APPARATUS FOR PREDICTING TRAFFIC AND TRANSMITTING A BUFFER PREDICTION STATUS REPORT

(71) Applicant: Electronics and Telecommunications Research Institute, Daejeon (KR)

(72) Inventors: Hyun Seo Park, Daejeon (KR); Yong Jin Kwon, Daejeon (KR); Yun Joo Kim, Daejeon (KR); An Seok Lee, Daejeon (KR); Yu Ro Lee, Daejeon (KR); Heesoo Lee, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 464 days.

(21) Appl. No.: 18/099,662

(22) Filed: Jan. 20, 2023

(65) Prior Publication Data

US 2023/0232396 A1 Jul. 20, 2023

(30) Foreign Application Priority Data

Jan. 20, 2022 (KR) .................. 10-2022-0008574
Dec. 8, 2022 (KR) .................. 10-2022-0170760

(51) Int. Cl.
*H04W 72/1268* (2023.01)
*H04W 72/542* (2023.01)
*H04W 76/20* (2018.01)

(52) U.S. Cl.
CPC ...... *H04W 72/1268* (2013.01); *H04W 72/542* (2023.01); *H04W 76/20* (2018.02)

(58) Field of Classification Search
CPC .......... H04W 72/1268; H04W 72/542; H04W 76/20; H04W 28/26; H04W 76/27; H04W 72/21
See application file for complete search history.

(56) References Cited

U.S. PATENT DOCUMENTS

| 9,819,465 | B2 | 11/2017 | Lee et al. |
| 10,039,026 | B2 | 7/2018 | Bae |
| 10,172,123 | B2 | 1/2019 | Kim et al. |
| 2010/0111004 | A1 | 5/2010 | Yi et al. |
| 2020/0050982 | A1 | 2/2020 | Newman et al. |

(Continued)

FOREIGN PATENT DOCUMENTS

| KR | 10-2368561 | 2/2022 |
| WO | 2014/096765 | 6/2014 |
| WO | 2020/032648 | 2/2020 |

*Primary Examiner* — Afshawn M Towfighi
(74) *Attorney, Agent, or Firm* — KILE PARK REED & HOUTTEMAN PLLC

(57) ABSTRACT

An operation method of a terminal in a communication system may comprise: predicting traffic using a traffic prediction function configured according to traffic prediction configuration information; transmitting a buffer prediction status report including a traffic prediction result to a base station; receiving a first physical uplink shared channel (PUSCH) resource allocation information generated based on the buffer prediction status report; and transmitting data to the base station using first resources allocated by the first PUSCH resource allocation information.

16 Claims, 12 Drawing Sheets

(56) References Cited

U.S. PATENT DOCUMENTS

2021/0345163 A1* 11/2021 Narasimha ........ H04W 28/0278
2023/0217304 A1*  7/2023 Singh .................... H04W 72/21
                                                     370/329
2024/0296382 A1*  9/2024 Wang ..................... G06N 5/022

* cited by examiner

METHOD AND APPARATUS FOR PREDICTING TRAFFIC AND TRANSMITTING A BUFFER PREDICTION STATUS REPORT

CROSS-REFERENCE TO RELATED APPLICATIONS

This application claims priority to Korean Patent Applications No. 10-2022-0008574, filed on Jan. 20, 2022, and No. 10-2022-0170760, filed on Dec. 8, 2022 with the Korean Intellectual Property Office (KIPO), the entire contents of which are hereby incorporated by reference.

BACKGROUND

1. Technical Field

The present disclosure relates to a data transmission technology in a communication system, and more particularly, to a data transmission technology capable of facilitating data transmission by predicting traffic of a terminal and reducing transmission delay based on the prediction in a communication system.

2. Related Art

With the development of information and communication technologies, various wireless communication technologies are being developed. As the representative wireless communication technologies, there may be long term evolution (LTE), new radio (NR), or the like defined as the 3rd generation partnership project (3GPP) specifications. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC). In addition, even in a 5G advanced system, standardization is progressing with the goal of advancing the eMBB, mMTC, and URLLC service scenarios.

In a communication system, a terminal may transmit uplink data using physical uplink shared channel (PUSCH) resources allocated by a base station. For PUSCH resource allocation, the terminal may report the amount of uplink data pending in the buffer to the base station by transmitting a buffer status report (BSR) message to the base station. The base station may allocate PUSCH resources capable of transmitting uplink data to the terminal based on the BSR. To this end, the terminal may be allocated PUSCH resources and transmit the BSR. In the case where the PUSCH resources for transmitting the BSR are not allocated, the terminal may transmit a scheduling request (SR) message to the base station in order to be allocated the PUSCH resource.

In this way, when uplink data to be transmitted is generated, quite a long transmission delay may be unavoidable until PUSCH resources are allocated for transmitting the corresponding data. Such uplink transmission delay may lead to downlink transmission, resulting in deterioration of overall perceived communication quality. In order to prevent transmission delay, the terminal may be pre-allocated with PUSCH resources regardless of the presence or absence of uplink data to be transmitted. However, pre-allocating PUSCH resources to the terminal with no data to transmit may incur the unnecessary waste of the corresponding resources.

Meanwhile, when uplink data to be transmitted is generated in an idle or inactive state, the terminal establishes or resumes a radio resource control (RRC) connection to be allocated with PUSCH resources to transmit the corresponding data. That is, quite a long transmission delay is likely to be unavoidable for a terminal in the idle or inactive state to transmit uplink data. This problem may occur even when the base station transmits downlink data.

SUMMARY

The present disclosure has been conceived to solve the above problems and it is an object of the present disclosure to provide a data transmission method and apparatus capable of facilitating data transmission by predicting traffic of a terminal and reducing transmission delay based on the prediction in a communication system.

According to a first exemplary embodiment of the present disclosure, an operation method of a terminal in a communication system may comprise: predicting traffic using a traffic prediction function configured according to traffic prediction configuration information; transmitting a buffer prediction status report including a traffic prediction result to a base station; receiving a first physical uplink shared channel (PUSCH) resource allocation information generated based on the buffer prediction status report; and transmitting data to the base station using first resources allocated by the first PUSCH resource allocation information.

The transmitting the buffer prediction status report including the traffic prediction result comprises: determining whether the traffic prediction result satisfies a reporting condition; transmitting, in response to the traffic prediction result satisfying the reporting condition, a scheduling request to the base station; receiving second PUSCH resource allocation information generated based on the scheduling request from the base station; and transmitting the buffer prediction status report to the base station using second resources allocated by the second PUSCH resource allocation information.

The traffic prediction result may comprise at least one of amount of uplink traffic, predicted generation time of uplink traffic, or prediction accuracy of uplink traffic.

The reporting condition may be at least one of a condition in which amount of uplink traffic is equal to or greater than a predetermined size, a condition in which predicted generation time of uplink traffic is within a predetermined period of time, or a condition in which prediction accuracy of uplink traffic is equal to or greater than a predetermined percentage.

The method may further comprise: receiving traffic prediction model information for each traffic prediction model identified by a traffic prediction model identifier from the base station; receiving traffic prediction configurating information including the traffic prediction model identifier from the base station; and configuring the traffic prediction function with a traffic prediction model identified by the traffic prediction model identifier.

The method may further comprise: receiving, from the base station, model feedback configuration information requesting transmission of a model feedback signal when a different between a measurement result and a prediction result at a predetermined time is equal to or greater than a threshold value; obtaining the measurement result by measuring traffic at the predetermined time; obtaining the prediction result by predicting a traffic at the predetermined time; and transmitting the model feedback signal to the base station in response to the measurement result and the prediction result being equal to or greater than the threshold value.

The transmitting the model feedback signal to the base station in response to the measurement result and the prediction result being equal to or greater than the threshold value may comprise: transmitting, in response to the measurement result and the prediction result being equal to or greater than the threshold value, an information availability indicator indicating the presence of a model feedback report to the base station; receiving a model feedback report request from the base station; and transmitting the model feedback signal including information on the measurement result and information on the prediction result to the base station.

The method may further comprise: receiving a traffic prediction activation command from the base station; and activating the traffic prediction function according to the traffic prediction activation command.

The method may further comprise: checking a state of the terminal upon prediction of generation of traffic according to the traffic prediction result; establishing, in response to the state being an idle state, a radio resource control (RRC) connection with the base station through an RRC connection establishment procedure; and resuming, in response to the state being inactive state, an RRC connection with the base station through an RRC connection resume procedure with the base station.

According to a second exemplary embodiment of the present disclosure, an operation method of a base station in a communication system may comprise: transmitting traffic prediction model information for each traffic prediction model identified by a traffic prediction model identifier to a terminal; generating traffic prediction configuration information including the traffic prediction model identifier; and transmitting the traffic prediction configuration information to the terminal.

The method may further comprise: receiving a buffer prediction status report including a traffic prediction result from the terminal; allocating first physical uplink shared channel (PUSCH) resources based on the buffer prediction status report; transmitting allocation information on the PUSCH resources to the terminal; and receiving data through the first PUSCH resources from the terminal.

The method may further comprise: receiving from the terminal a scheduling request generated based on a traffic prediction result predicted according to the traffic prediction configuration information; allocating second PUSCH resources based on the scheduling request; transmitting allocation information on the second PUSCH resources to the terminal; and receiving a buffer prediction status report through the second PUSCH resources.

The method may further comprise: predicting downlink traffic using a traffic prediction model; checking a state of the terminal upon prediction of generation of the downlink traffic; transmitting a paging message to the terminal when the state is an idle state or an inactive state; and initiating a radio resource control (RRC) connection establishment or RRC resume procedure with the terminal.

According to a third exemplary embodiment of the present disclosure, a terminal may comprise: a processor configured to control the terminal to predict traffic using a traffic prediction function configured according to traffic prediction configuration information, transmit a buffer prediction status report including a traffic prediction result to a base station, receive a first physical uplink shared channel (PUSCH) resource allocation information generated based on the buffer prediction status report, and transmit data to the base station using first resources allocated by the first PUSCH resource allocation information.

The processor may be further configured, in transmitting the buffer prediction status report including the traffic prediction result, to control the terminal to determine whether the traffic prediction result satisfies a reporting condition, transmit, in response to the traffic prediction result satisfying the reporting condition, a scheduling request to the base station, receive second PUSCH resource allocation information generated based on the scheduling request from the base station, and transmit the buffer prediction status report to the base station using second resources allocated by the second PUSCH resource allocation information.

The traffic prediction result may comprise at least one of amount of uplink traffic, predicted generation time of uplink traffic, or prediction accuracy of uplink traffic.

The reporting condition may be at least one of a condition in which amount of uplink traffic is equal to or greater than a predetermined size, a condition in which predicted generation time of uplink traffic is within a predetermined period of time, or a condition in which prediction accuracy of uplink traffic is equal to or greater than a predetermined percentage.

The processor may be further configured to control the terminal to receive, from the base station, model feedback configuration information requesting transmission of a model feedback signal when a different between a measurement result and a prediction result at a predetermined time is equal to or greater than a threshold value, obtain the measurement result by measuring traffic at the predetermined time, obtain the prediction result by predicting a traffic at the predetermined time, and transmit the model feedback signal to the base station in response to the measurement result and the prediction result being equal to or greater than the threshold value.

The processor may be further configured to control the terminal to check a state of the terminal upon prediction of generation of traffic according to the traffic prediction result, establish, in response to the state being an idle state, a radio resource control (RRC) connection with the base station through an RRC connection establishment procedure, and resuming, in response to the state being inactive state, an RRC connection with the base station through an RRC connection resume procedure with the base station.

According to the present disclosure, a terminal is capable of predicting uplink traffic and reporting a predicted buffer status to a base station. Thus, according to the present disclosure, the terminal is capable of being allocated with physical uplink shared channel (PUSCH) resources in advance to transmit, upon generation of uplink data, the uplink data, resulting in reduction of transmission delay and resultantly improvement of uplink transmission performance.

According to the present disclosure, a terminal in an idle or inactive state is capable of predicting uplink traffic and establishing and resuming a radio resource control (RRC) connection in advance when uplink data transmission is expected based on the uplink traffic prediction. Thus, according to the present disclosure, the terminal is capable of reporting the predicted buffer status to the base station to be allocated with PUSCH resources in advance to transmit, upon generation of uplink data, the corresponding data, resulting in reduction of transmission delay and resultantly improvement of upper link transmission performance.

In addition, according to the present disclosure, the network is capable of predicting downlink traffic for a terminal in an idle or inactive state. According to the present disclosure, the network is also capable of transmitting a paging signal to the corresponding terminal through a base station to transmit the predicted downlink traffic.

Thus, according to the present disclosure, a terminal, upon receipt of the paging signal, is capable of establishing or resuming an RRC connection in advance in order for the network to transmit downlink data to the terminal. Therefore, according to the present disclosure, it is possible to improve the downlink transmission performance by considerably reducing the delay from generation of downlink data until completion of transmission from the network to the terminal in the idle or inactive state.

DETAILED DESCRIPTION OF THE EMBODIMENTS

Figure 1:
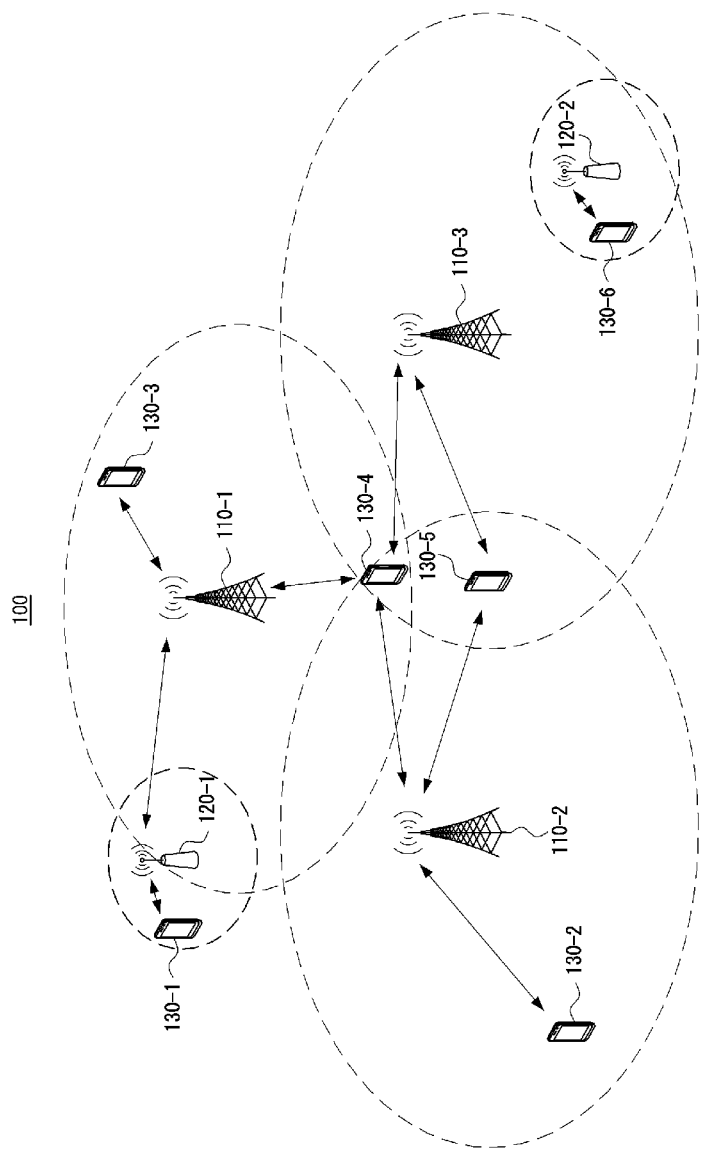
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single-carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
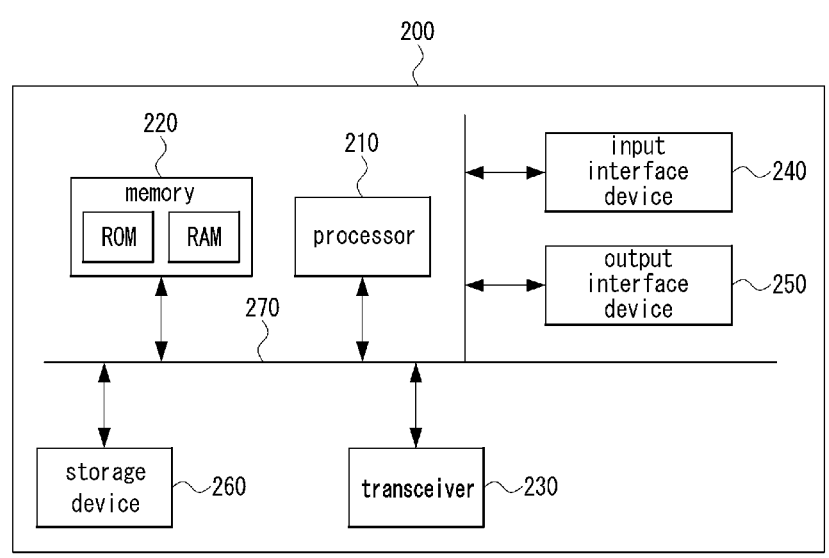
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

In such a communication system, a terminal may transmit uplink data using a physical uplink shared channel (PUSCH) resource allocated by a base station. For PUSCH resources allocation, the terminal may transmit a buffer status report (BSR) message to the base station to report the amount of uplink data pending in the buffer to the base station. The base station may allocate PUSCH resources for use in transmitting uplink data to the terminal based on the BSR. To this end, the terminal may be allocated PUSCH resources for BSR transmission.

Figure 3:
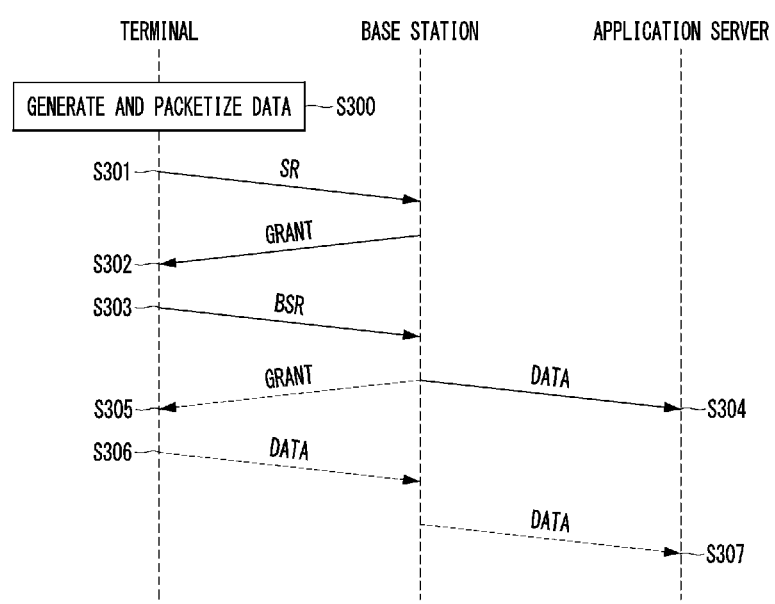
FIG. 3 is a signal flow diagram illustrating a first embodiment of a method for transmitting uplink data in a communication system.

FIG. 3 is a signal flow diagram illustrating a first embodiment of a method for transmitting uplink data in a communication system.

With reference to FIG. 3, the terminal may generate and packetize data at step S300 and transmit, at step S301, a scheduling request (SR) message for PUSCH resources allocation when PUSCH resources for transmitting BSR are not allocated. Then, the base station may receive the scheduling request message from the terminal. Next, the base station may allocate PUSCH resources for transmission of the BSR in response to the scheduling request from the terminal. Here, with no awareness of the exact amount of uplink data for which PUSCH resources are to be allocated to the terminal, the base station may allocate PUSCH resources of an appropriate level.

Next, the base station may transmit, at step S302, an uplink grant including PUSCH resource allocation information to the terminal through a physical downlink control channel (PDCCH). The terminal may receive the uplink grant including the PUSCH resources allocation information from the base station. The terminal may transmit, at step S303, the BSR to the base station using the allocated PUSCH resources identified through the uplink grant. In this case, when there are remaining PUSCH resources, the terminal may transmit limited data to the base station using the remaining PUSCH resources. Then, the base station may receive the BSR and data from the terminal. Here, the base station may transmit the received data to an application server at step S304. Then, the application server may receive data from the base station.

Meanwhile, the base station may allocate PUSCH resources for the terminal to be able to transmit data in the buffer according to the received BSR. Next, the base station may transmit, at step S305, an uplink grant including PUSCH resources allocation information to the terminal through the PDCCH. The terminal may receive the uplink grant from the base station. The terminal may transmit data to the base station at step S306 using the allocated PUSCH resources. Then, the base station may receive data from the terminal. Next, the base station may transmit the received data to the application server at step S307. Accordingly, the application server may receive data from the base station. As such, since the terminal transmits uplink data through various processes, a considerable delay may occur from the generation of uplink data until the completion of transmission.

Meanwhile, the terminal may predict uplink traffic in the communication system. The terminal may be configured to an uplink traffic prediction function according to the configuration of the base station or network. Alternatively, the terminal may be autonomously configured to have the uplink traffic prediction function.

Figure 4:
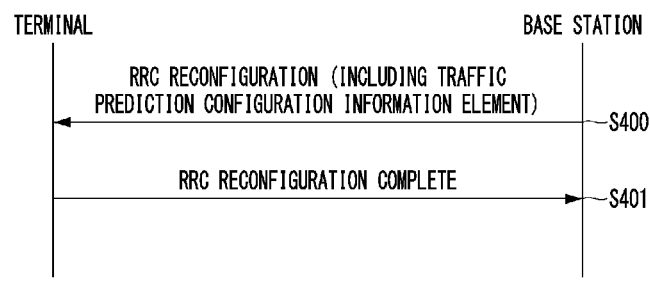
FIG. 4 is a flowchart illustrating a first embodiment of a method of configuring a traffic prediction function in a terminal in a communication system.

FIG. 4 is a flowchart illustrating a first embodiment of a method of configuring a traffic prediction function in a terminal in a communication system.

With reference to FIG. 4, a base station may configure a traffic prediction function as necessary in the terminal capable of predicting traffic in consideration of terminal capability. The base station may generate traffic prediction configuration information suitable for the terminal. The base station may also configure a traffic prediction configuration information element (abbreviated as trafficPredictionConfig IE) including the generated traffic prediction configuration information.

Afterward, the base station may generate an RRC reconfiguration message including a traffic prediction configuration information element and transmit the message to the terminal at step S400. Then, the terminal may receive the RRC reconfiguration message including the traffic prediction configuration information element. Next, the terminal may configure the traffic prediction function according to the traffic prediction configuration information of the traffic prediction configuration information element included in the received RRC reconfiguration message. Afterward, the terminal may perform traffic prediction using the traffic prediction function in an active state. In addition, the terminal may maintain the configured traffic prediction function even when transitioning to an idle or inactive state, as necessary. Meanwhile, the terminal may transmit, at step S401, an RRC reconfiguration complete message to the base station in response to the RRC reconfiguration message. Then, the base station may receive the RRC reconfiguration complete message from the terminal.

Figure 5:
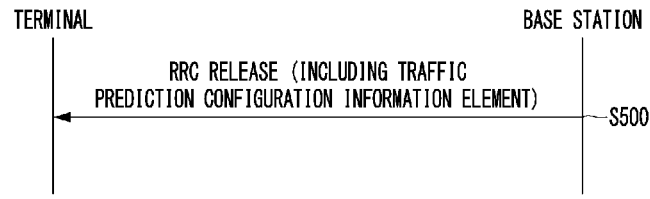
FIG. 5 is a signal flow diagram illustrating a second embodiment of a method of configuring a traffic prediction function in a terminal in a communication system.

FIG. 5 is a signal flow diagram illustrating a second embodiment of a method of configuring a traffic prediction function in a terminal in a communication system.

With reference to FIG. 5, a base station may configure a traffic prediction function as necessary in the terminal capable of predicting traffic in consideration of terminal capability. The base station may generate traffic prediction configuration information suitable for the terminal. The base station may also configure a traffic prediction configuration information element (i.e., trafficPredictionConfig IE) including the generated traffic prediction configuration information.

Afterward, the base station may generate an RRC release message including a traffic prediction configuration information element and transmit the message to the terminal at step S500. Then, the terminal may receive the RRC release message including the traffic prediction configuration information element. Next, the terminal may configure the traffic prediction function according to the traffic prediction configuration information of the traffic prediction configuration information element included in the received RRC release message. Afterward, the terminal may perform traffic prediction using the traffic prediction function in an idle or inactive state.

Figure 6A:
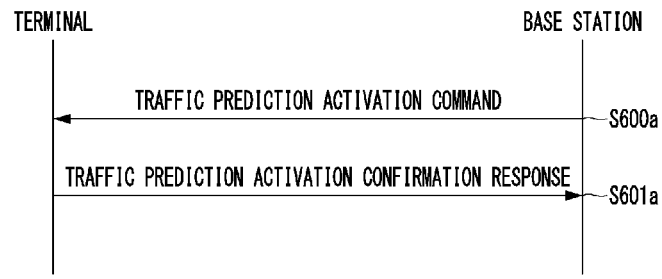
FIG. 6A is a signal flow diagram illustrating a method of activating a traffic prediction function of a terminal according to a first embodiment.
Figure 6B:
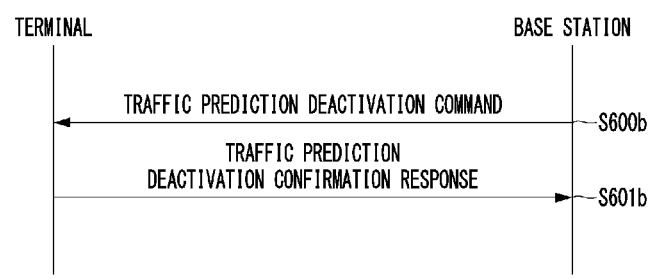
FIG. 6B is a signal flow diagram illustrating a method of inactivating a traffic prediction function of a terminal according to a first embodiment.

FIG. 6A is a signal flow diagram illustrating a method of activating a traffic prediction function of a terminal according to a first embodiment, and FIG. 6B is a signal flow diagram illustrating a method of inactivating a traffic prediction function of a terminal according to a first embodiment.

With reference to FIGS. 6A and 6B, the base station may activate or deactivate the traffic prediction function for a terminal configured with the traffic prediction function. When configured, the traffic prediction function may be enabled or disabled by default. The base station may transmit, at step S600a, a traffic prediction activation command message to activate the traffic prediction function of the terminal. Then, the terminal may receive the traffic prediction activation command message from the base station. Next, the terminal may activate the traffic prediction function. Accordingly, the terminal may transmit a traffic prediction activation confirmation response message to the base station at step S601a. The base station may receive the traffic prediction activation confirmation response message from the terminal and confirm the traffic prediction activation of the terminal. Meanwhile, the base station may transmit, at step S600b, a traffic prediction deactivation command message to deactivate the traffic prediction function of the terminal. Then, the terminal may receive the traffic prediction deactivation command message from the base station. Next, the terminal may deactivate the traffic prediction function. Accordingly, the terminal may transmit a traffic prediction deactivation confirmation response message to the base station at step S601b. The base station may receive the traffic prediction deactivation confirmation response message from the terminal and confirm the traffic prediction deactivation of the terminal.

Such a traffic prediction activation or deactivation command message may be transmitted as medium access control (MAC) control information. Alternatively, the traffic prediction activation or deactivation command may be carried in an RRC message. In addition, the traffic prediction activation or deactivation command may be applied to all logical channels. Alternatively, the traffic prediction activation or deactivation command may be applied per logical channel group. Alternatively, the traffic prediction activation or deactivation command may be applied per logical channel.

Meanwhile, layer 2 of the terminal may predict uplink traffic. The MAC of the terminal may determine the predicted amount of uplink data. To this end, the MAC of the terminal may predict the data amount of MAC control information to be transmitted. For example, the MAC of the terminal may predict the data amount of BSR, power headroom report (PHR), or the like to be transmitted when a timer expires.

Radio link control (RLC) of the terminal can predict the data amount of RLC protocol data units (RLC control PDUs) to be transmitted. For example, the RLC of the terminal may predict the data amount of status PDUs or the like to be transmitted when a timer expires. In addition, the RLC of the terminal may predict the data amount of the RLC data PDUs to be retransmitted. For example, the RLC of the terminal may predict the data amount the RLC data PDU to be retransmitted based on the MAC hybrid automatic repeat and request (HARQ) transmission result.

A packet data convergence protocol (PDCP) of the terminal can predict the data amount of PDCP control PDUs to be transmitted. For example, the PDCP of the terminal may predict the data amount of a robust header compression (ROHC) feedback, PDCP status report, or the like. In addition, the PDCP of the terminal may predict the data amount of PDCP data PDUs or PDCP service data units (SDUs) to be retransmitted. For example, the PDCP of the terminal may predict the amount of data to be retransmitted, such as PDCP re-establishment, data recovery, and uplink (UL) data switching.

A service data adaptation protocol (SDAP) of the terminal may predict the data amount of SDAP control PDUs to be transmitted. For example, the SDAP of the terminal may predict the data amount of an end-marker or the like.

Layer 3 of the terminal may predict uplink traffic. Layer 3 of the terminal may report the uplink traffic prediction result to the radio resource control (RRC) of the terminal. Accordingly, the RRC of the terminal may receive the uplink traffic prediction result from Layer 3 of the terminal. Next, the RRC of the terminal may report the uplink traffic prediction result received from Layer 3 to the MAC. The RRC of the terminal may report the uplink traffic prediction result received from Layer 3 to the MAC through the terminal control unit.

Layer 3 of the terminal may directly report the uplink traffic prediction result to the MAC of the terminal. Layer 3 of the terminal may report the uplink traffic prediction result to the MAC through the terminal control unit. Alternatively, Layer 3 of the terminal may report the uplink traffic prediction result to the MAC through the SDAP. For example, Layer 3 of the terminal may predict an uplink traffic pattern through time series prediction.

Alternatively, Layer 3 of the terminal may predict generation of uplink traffic through the operation of a specific application. For example, Layer 3 of the terminal may predict generation of uplink traffic through analysis of packets generated periodically in a specific application. Alternatively, Layer 3 of the terminal can predict uplink traffic generation through the user's motion. For example, Layer 3 of the terminal can predict generation of uplink traffic through a user's keyboard input operation, button press operation, screen-on operation, or the like. Here, the uplink traffic prediction result may include an amount of uplink traffic, an expected uplink traffic generation time, and uplink traffic prediction accuracy.

Meanwhile, a traffic prediction technology of a terminal may predict traffic of the terminal by executing an artificial intelligence (AI) algorithm and/or a machine learning algorithm. To this end, the traffic prediction technology of the terminal may factor in model training or model inference as an option.

Here, artificial intelligence, as a field of computer engineering and information technology studying methods allowing computers to do thinking, learning, and self-development possible with human intelligence, may mean enabling computers to imitate intelligent human behavior. And machine learning, as a field of artificial intelligence, may include a field of study that gives computers the ability to learn without explicit programming. In detail, machine learning is seen as a technology capable of building systems learning and making predictions based on empirical data, improving its performance on its own, and researching algorithms for them. Machine learning algorithms may take the form of building specific models to derive predictions or decisions based on input data rather than executing rigidly defined static program instructions.

A base station may manage machine learning models for traffic prediction. Here, the base station may transmit information about machine learning models including machine learning model identifier information to the terminal. The terminal may receive information about machine learning models including machine learning model identifier information from the base station. In this case, the machine learning models for traffic prediction may be distinguished by machine learning model identifiers for traffic prediction.

Meanwhile, the base station may transmit traffic prediction configuration information including a machine learning model identifier for traffic prediction to the terminal. Then, the terminal may receive the traffic prediction configuration information including the machine learning model identifier for traffic prediction from the base station. The terminal may configure a traffic prediction function to predict traffic using a traffic prediction machine learning model identified by the traffic prediction machine learning model identifier. In this way, the terminal may predict traffic using the machine learning model identified by the machine learning model identifier received from the base station through the traffic prediction configuration.

Figure 7:
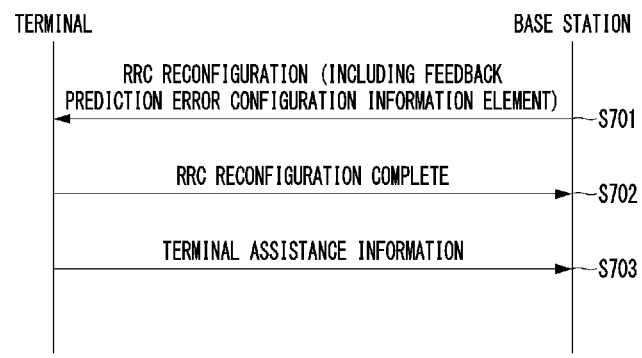
FIG. 7 is a signal flow diagram illustrating a first embodiment of a traffic prediction model feedback method in a communication system.

FIG. 7 is a signal flow diagram illustrating a first embodiment of a traffic prediction model feedback method in a communication system.

With reference to FIG. 7, the base station may generate and transmit traffic prediction model feedback configuration information to the terminal. Here, the base station may transmit, to the terminal, traffic prediction configuration information including the traffic prediction model feedback configuration information. Alternatively, the base station may configure the traffic prediction model feedback configuration information in a traffic prediction error configuration information element (abbreviated as predictionError-Config IE). Here, the traffic prediction model feedback configuration information may include a condition for transmitting traffic prediction model feedback report information and traffic prediction model feedback information availability (abbreviated as predictionFeedbackInfoAvailable) indicator. Here, the traffic prediction model feedback information availability indicator may be an indicator indicating the presence of traffic prediction model feedback report information. Meanwhile, the traffic prediction model feedback report information may include an uplink traffic prediction result at the prediction time and an uplink traffic generation result at the measurement time. In addition, the traffic prediction model feedback report information may further include information necessary to reduce an error between two results. Here, the measurement time and the prediction time may be the same.

Meanwhile, the transmission condition may be a condition for the periodic transmission of a traffic prediction model feedback signal or a traffic prediction model feedback information availability indicator. Alternatively, the transmission condition may be a condition for event-driven transmission of a traffic prediction model feedback signal or a traffic prediction model feedback information availability indicator, triggered by a predetermined event. Here, the predetermined event may be a case where an error between the uplink traffic generation result at the measurement time and the uplink traffic prediction result at the prediction time is equal to or greater than an error-specific threshold value. Here, the traffic prediction error configuration information element may include one of machine learning loss functions. For example, the loss function may be a mean absolute error (MAE), mean square error (MSE), root mean square error (RMSE), etc. The traffic prediction error configuration information element may include an error-specific threshold value to trigger the transmission of a traffic prediction model feedback when an error is equal to or greater than or equal to the error-specific threshold value. In addition, the traffic prediction error configuration information element may include a time step that is a target for calculating a loss function. Unless the time step is specified, the terminal may use the entire traffic prediction result as a target for calculating the loss function. The traffic prediction error configuration information element may include a specific time to compute the loss function.

Meanwhile, the base station may transmit, at step S701, an RRC reconfiguration message including a feedback prediction error configuration information element to the terminal. Accordingly, the terminal may receive the RRC reconfiguration message including the traffic prediction error configuration information element from the base station. The terminal may configure the traffic prediction model feedback according to the traffic prediction model feedback configuration information in the traffic prediction error configuration information element. Thereafter, the terminal may transmit, at step S702, an RRC reconfiguration complete message to the base station in response to the RRC reconfiguration message. The base station may receive the RRC reconfiguration complete message from the terminal.

Meanwhile, upon occurrence of a predetermined event, the terminal may transmit to the base station, at step S703, terminal assistance information (user equipment (UE) assistance information, abbreviated as UEAssistancInformation) including feedback prediction model feedback report information (prediction feedback information, abbreviated as predictionFeedbackInfo) according to the feedback prediction model feedback configuration information. For example, the terminal may transmit a terminal assistance information message including feedback prediction model feedback report information to the base station when the error between the traffic measurement result at a predetermined time and the traffic prediction result at a prediction time is equal to or greater than a predetermined threshold value.

Then, the base station may receive the terminal assistance information message including feedback prediction model feedback report information from the terminal. Here, the feedback prediction model feedback report information may include a traffic measurement result at the measurement time and a traffic prediction result at the prediction time. In addition, the traffic prediction model feedback report information may further include information necessary to reduce an error between the two results. The traffic prediction model feedback report information may also include a loss function value. The loss function value may be included in the traffic prediction model feedback information availability indicator.

The base station may receive feedback prediction model feedback report information from the terminal to improve the machine learning performance of the machine learning model for feedback prediction based on the feedback prediction model feedback report information and, if necessary, update the machine learning model for feedback prediction of the terminal. Meanwhile, in the case where the terminal performs model training for the machine learning model for feedback prediction, it may not transmit feedback prediction model feedback report information to the base station and may train the corresponding machine learning model for feedback prediction by itself to improve machine learning performance.

As an alternative method, upon occurrence of a predetermined event, the terminal may transmit to the base station a terminal assistance information message (UEAssistancInformation) including a feedback prediction model feedback information availability indicator (predictionFeedbackInfoAvailable) according to the feedback prediction model feedback configuration information. For example, the terminal may transmit a terminal assistance information message including a feedback prediction model feedback information availability indicator to the base station when the error between the traffic measurement result at a predetermined time and the traffic prediction result at the prediction time is equal to or greater than a predetermined threshold value. As such, the terminal may notify the base station that there is a feedback prediction model feedback report by transmitting the terminal assistance information message including the feedback prediction model feedback information availability indicator to the base station. Accordingly, the base station may receive the terminal assistance information message including the feedback prediction model feedback information availability indicator from the terminal.

Meanwhile, in response to the terminal information assistance message, the base station may transmit a terminal information request message including a feedback prediction model feedback report request indicator to the terminal to request transmission of feedback prediction model feedback report information. The terminal may receive the terminal information request message requesting transmission of the feedback prediction model feedback report information from the base station. Then, the terminal may transmit the feedback prediction model feedback report information to the base station. Here, the terminal may transmit the feedback prediction model feedback report information to the base station using a terminal information response message including the feedback prediction model feedback report information. Then, the base station may receive a the terminal information response message including the feedback prediction model feedback report information. Here, the feedback prediction model feedback report information may include a traffic measurement result at the measurement time and a traffic prediction result at the prediction time. In addition, the traffic prediction model feedback report information may further include information necessary to reduce an error between the two results. The traffic prediction model feedback report information may also include a loss function value. The loss function value may be included in the traffic prediction model feedback information availability indicator.

The base station may receive feedback prediction model feedback report information from the terminal to improve the machine learning performance of the machine learning model for feedback prediction based on the feedback prediction model feedback report information and, if necessary, update the machine learning model for feedback prediction of the terminal. Meanwhile, in the case where the terminal performs model training for the machine learning model for feedback prediction, it may not transmit feedback prediction model feedback report information to the base station and may train the corresponding machine learning model for feedback prediction by itself to improve machine learning performance.

Figure 8:
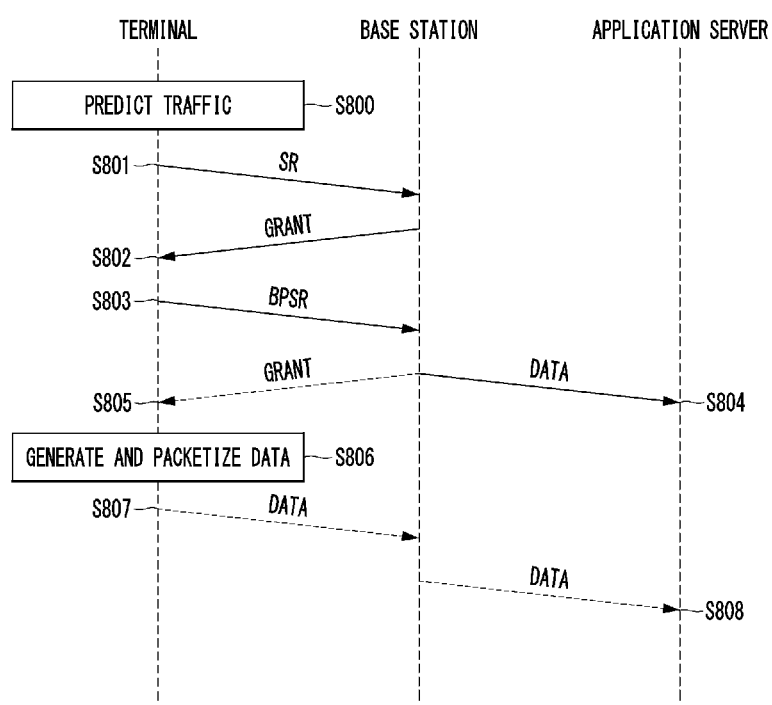
FIG. 8 is a signal flow diagram illustrating a second embodiment of a method for transmitting uplink data in a communication system.

FIG. 8 is a signal flow diagram illustrating a second embodiment of a method for transmitting uplink data in a communication system.

With reference to FIG. 8, a terminal in an active state may, at step S800, predict traffic using a traffic prediction function configured according to traffic prediction configuration information. As a result, the terminal may predict the generation of uplink data to be transmitted to the base station. As such, when the generation of uplink data to be transmitted to the base station is predicted, the terminal may determine that the reporting condition is satisfied and transmit a buffer prediction status report (BPSR) message to the base station. Alternatively, when the amount of uplink data to be transmitted to the base station is predicted to be equal to or greater than a predetermined size, the terminal may determine that the reporting condition is satisfied and transmit a buffer prediction status report (BPSR) message to the base station. Here, the predetermined size may be, for example, 1000 bytes. Alternatively, when the generation of uplink data to be transmitted to the base station is predicted within a predetermined time, the terminal may determine that the reporting condition is satisfied and transmit a buffer prediction status report (BPSR) message to the base station. Here, the predetermined time may be, for example, 10 msec. Alternatively, when the prediction accuracy of uplink data to be transmitted to the base station is equal to or higher than a predetermined percentage, the terminal may determine that the reporting condition is satisfied and transmit a buffer prediction status report (BPSR) message to the base station. Here, the predetermined percentage may be, for example, 90%.

Alternatively, i) when the amount of uplink data to be transmitted to the base station is predicted to be equal to or greater than a predetermined size and ii) when the generation of uplink data to be transmitted to the base station is predicted within a predetermined time, the terminal may determine that the reporting condition is satisfied and transmit a buffer prediction status report (BPSR) message to the base station. Alternatively, i) when the amount of uplink data to be transmitted to the base station is predicted to be equal to or greater than a predetermined size and ii) when the prediction accuracy of uplink data to be transmitted to the base station is equal to or higher than a predetermined percentage, the terminal may determine that the reporting condition is satisfied and transmit a buffer prediction status report (BPSR) message to the base station. Alternatively, i) when the generation of uplink data to be transmitted to the base station is predicted within a predetermined time and ii) when the prediction accuracy of uplink data to be transmitted to the base station is equal to or higher than a predetermined percentage, the terminal may determine that the reporting condition is satisfied and transmit a buffer prediction status report (BPSR) message to the base station. Alternatively, when the result of multiplying the amount of uplink data to be transmitted to the base station by the prediction accuracy of the uplink data to be transmitted to the base station is greater than a predetermined size, the terminal may determine that the reporting condition is satisfied and transmit a buffer prediction status report (BPSR) message to the base station.

The buffer prediction status report (BPSR) may include information on predicted buffer size (i.e., predicted buffer size information). Here, the predicted buffer size information may mean a predicted amount of traffic. The predicted buffer size information may abide by the buffer size format of buffer size information (BSR). The buffer prediction status report (BPSR) may include a time at which data is predicted to be generated (i.e., expected traffic generation time). Here, the expected traffic generation time may be a relative time, at which data generation is predicted, in units of msec from the BPSR transmission time. Alternatively, the expected traffic generation time may be expressed as an absolute time based on a predetermined time point. Also, the buffer prediction status report may include traffic prediction accuracy. Here, traffic prediction accuracy may be expressed as a probability on a predetermined scale. For example, the traffic prediction accuracy may express data prediction accuracy in units of 10%.

Meanwhile, the buffer prediction status report (BPSR) may be carried in a MAC control element (MAC CE) of total BPSR, short BPSR, or long BPSR. The total BPSR may indicate a total expected buffer size of all logical channels regardless of logical channel groups (LCGs). The short BPSR may indicate a specific LCG and an expected buffer size corresponding to the specific LCG. The long BPSR may indicate a predicted buffer size per LCG. The short BPSR and long BPSR may abide by the already defined MAC CE format of short BSR or long BSR.

Here, when the PUSCH resource for transmitting the BPSR is not allocated, the terminal may transmit a scheduling request (SR) message, at step S801, to the base station in order to be allocated PUSCH resources. Then, the base station may receive the scheduling request message from the terminal. Next, the base station may allocate PUSCH resources for transmission of the BPSR in response to the scheduling request from the terminal. Here, with no awareness of the exact amount of uplink data for which PUSCH resources are to be allocated to the terminal, the base station may allocate PUSCH resources of an appropriate level.

Next, the base station may transmit, at step S802, an uplink grant including PUSCH resources allocation information to the terminal through the PDCCH. The terminal may receive the uplink grant including the PUSCH resources allocation information from the base station. The terminal may transmit, at step S803, the BPSR to the base station using the allocated PUSCH resources identified through the uplink grant. In this case, when there are remaining PUSCH resources, the terminal may be able to transmit limited data to the base station using the remaining PUSCH resources. Then, the base station may receive the BPSR and data from the terminal. Here, the base station may transmit the received data to an application server at step S804. Then, the application server may receive data from the base station.

Meanwhile, the base station may allocate PUSCH resources for the terminal to be able to transmit data in the buffer according to the received BPSR. Next, the base station may transmit, at step S805, an uplink grant including PUSCH resources allocation information to the terminal through the PDCCH. The terminal may receive the uplink grant from the base station. The terminal may generate and packetize the data at step S806 and transmit the data to the base station using the allocated PUSCH resource at step S807. Then, the base station may receive data from the terminal. Next, the base station may transmit the received data to the application server at step S808. Accordingly, the application server may receive data from the base station. In this way, by transmitting the uplink data based on the traffic prediction result, it is possible for the terminal to considerably reduce the delay from generation of uplink data until completion of transmission. In the best case, when actual data is generated at the time when PUSCH resources for transmission of uplink data are allocated, delay from data generation until completion of transmission may be almost eliminated.

Figure 9:
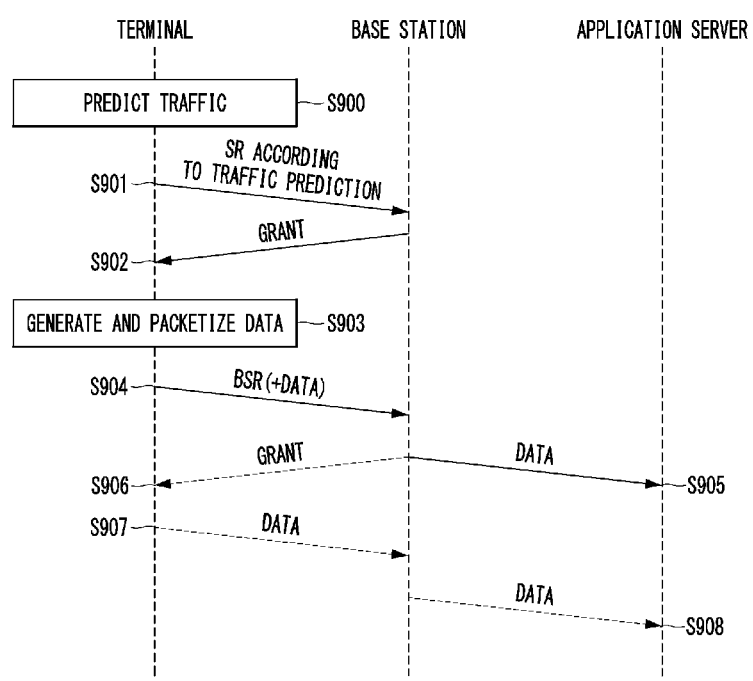
FIG. 9 is a signal flow diagram illustrating a third embodiment of a method for transmitting uplink data in a communication system.

FIG. 9 is a signal flow diagram illustrating a third embodiment of a method for transmitting uplink data in a communication system.

With reference to FIG. 9, the terminal may perform traffic prediction at step S900 using the traffic prediction function configured in the active state. As a result, the terminal may predict the generation of uplink data to be transmitted to the base station. As such, when the generation of uplink data to be transmitted to the base station is predicted, the terminal may determine that the reporting condition is satisfied and transmit a (BPSR) message to the base station. Alternatively, when the amount of uplink data to be transmitted to the base station is predicted to be equal to or greater than a predetermined size, the terminal may determine that the reporting condition is satisfied and transmit a buffer prediction status report (BPSR) message to the base station. Here, the predetermined size may be, for example, 1000 bytes. Alternatively, when the generation of uplink data to be transmitted to the base station is predicted within a predetermined time, the terminal may determine that the reporting condition is satisfied and transmit a buffer prediction status report (BPSR) message to the base station. Here, the predetermined time may be, for example, 10 msec. Alternatively, when the prediction accuracy of uplink data to be transmitted to the base station is equal to or higher than a predetermined percentage, the terminal may determine that the reporting condition is satisfied and transmit a buffer prediction status report (BPSR) message to the base station. Here, the predetermined percentage may be, for example, 90%.

Alternatively, i) when the amount of uplink data to be transmitted to the base station is predicted to be equal to or greater than a predetermined size, and ii) when the generation of uplink data to be transmitted to the base station is predicted within a predetermined time, the terminal may determine that the reporting condition is satisfied and transmit a buffer prediction status report (BPSR) message to the base station. Alternatively, i) when the amount of uplink data to be transmitted to the base station is predicted to be equal to or greater than a predetermined size and ii) when the prediction accuracy of uplink data to be transmitted to the base station is equal to or higher than a predetermined percentage, the terminal may determine that the reporting condition is satisfied and transmit a buffer prediction status report (BPSR) message to the base station. Alternatively, i) when the generation of uplink data to be transmitted to the base station is predicted within a predetermined time and ii) when the prediction accuracy of uplink data to be transmitted to the base station is equal to or higher than a predetermined percentage, the terminal may determine that the reporting condition is satisfied and transmit a buffer prediction status report (BPSR) message to the base station. Alternatively, when the result of multiplying the amount of uplink data to be transmitted to the base station by the prediction accuracy of the uplink data to be transmitted to the base station is greater than a predetermined size, the terminal may determine that the reporting condition is satisfied and transmit a buffer prediction status report (BPSR) message to the base station.

The buffer prediction status report (BPSR) may include information on predicted buffer size (i.e., predicted buffer size information). Here, the predicted buffer size information may mean a predicted amount of traffic. The predicted buffer size information may abide by the buffer size format of buffer size information (BSR). The buffer prediction status report (BPSR) may include a time at which data is predicted to be generated (i.e., expected traffic generation time). Here, the expected traffic generation time may be a relative time, at which data generation is predicted, in units of msec from the BPSR transmission time. Alternatively, the expected traffic generation time may be expressed as an absolute time based on a predetermined time point. Also, the buffer prediction status report may include traffic prediction accuracy. Here, traffic prediction accuracy may be expressed as a probability on a predetermined scale. For example, the traffic prediction accuracy may express data prediction accuracy in units of 10%.

Meanwhile, the buffer prediction status report (BPSR) may be carried in a MAC control element (MAC CE) of a total BPSR, short BPSR, or long BPSR. The total BPSR may indicate the total amount of expected buffer sizes of all logical channels regardless of (LCGs). The short BPSR may indicate a specific LCG and an expected buffer size corresponding to the specific LCG. The long BPSR may indicate a predicted buffer size per LCG. The short BPSR and long BPSR may abide by the already defined MAC CE format of short BSR or long BSR.

With reference to FIG. 3, the terminal may generate and packetize data at step S300 and transmit, at step S901 (SR) message for PUSCH resources allocation when PUSCH resources for transmitting BPSR are not allocated. Then, the base station may receive the scheduling request message from the terminal. Here, with no awareness of the exact amount of uplink data for which PUSCH resources are to be allocated to the terminal, the base station may allocate PUSCH resources of an appropriate level.

Next, the base station may transmit, at step S902, an uplink grant including PUSCH resources allocation information to the terminal through the PDCCH. The terminal may receive the uplink grant including the PUSCH resources allocation information from the base station. Here, when the data to be transmitted has already been generated, the terminal may packetize, at step S903, the data to be transmitted, and transmit, at step S904, the BSR to the base station instead of transmitting the BPSR. In this case, when there are remaining PUSCH resources, the terminal may transmit limited data to the base station using the remaining PUSCH resources. Then, the base station may receive the BSR and data from the terminal. Here, the base station may transmit the received data to an application server at step S905. Then, the application server may receive data from the base station.

Meanwhile, the base station may allocate PUSCH resources for the terminal to be able to transmit data in the buffer according to the received BSR. Next, the base station may transmit, at step S906, an uplink grant including PUSCH resources allocation information to the terminal through the PDCCH. The terminal may receive the uplink grant from the base station. The terminal may transmit data to the base station at step S907 using the allocated PUSCH resources. Then, the base station may receive data from the terminal. Next, the base station may transmit the received data to the application server at step S908. Accordingly, the application server may receive data from the base station. In this way, by transmitting the uplink data based on the traffic prediction result, it is possible for the terminal to considerably reduce the delay from the generation of uplink data to the completion of transmission. In the best case, when actual data is generated at the time when PUSCH resources for transmission of uplink data are allocated, delay from data generation until completion of transmission may be almost eliminated. Here, when the generation of additional uplink data is predicted, the terminal may transmit the BP SR along with the data.

Meanwhile, in order to reduce battery consumption of the terminal, when there is no data transmission or reception activity for a predetermined period of time, the network may release the network connection and wireless connection of the terminal in normal cases. In this case, the terminal may transition to an idle state. When uplink traffic is generated in the idle state, the terminal may transmit a non-access stratum (NAS) service request message to the base station to establish a wireless connection again to be allocated with radio resources and network resources from the base station for transmitting and receiving data.

Figure 10:
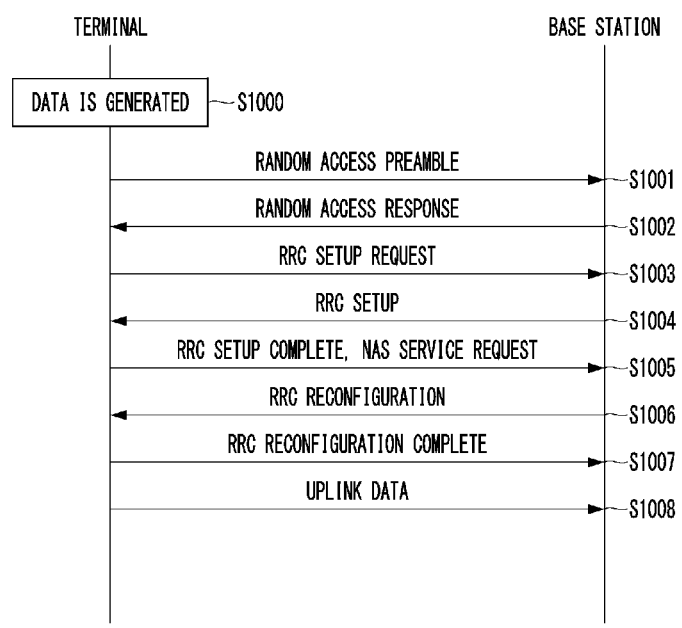
FIG. 10 is a signal flow diagram illustrating a first embodiment of a service request method in a communication system.

FIG. 10 is a signal flow diagram illustrating a first embodiment of a service request method in a communication system.

With reference to FIG. 10, a terminal may be in an idle state. In this state, uplink data may be generated in the terminal at step S1000. Then, the terminal may transmit a random access preamble to a base station at step S1001. Accordingly, the base station may receive the random access preamble from the terminal.

Next, the base station may transmit a random access response message to the terminal at step S1002. The terminal may receive a random access response message from the base station. Accordingly, the terminal may transmit an RRC setup request message to the base station at step S1003. The base station may receive the RRC setup request message from the terminal. Then, the base station may transmit an RRC setup message to the terminal at step S1004. Accordingly, the terminal may receive the RRC setup message from the base station. As such, the terminal may establish an RRC connection with the base station through the RRC connection establishment procedure.

Afterward, the terminal may transmit an RRC setup completion message and a NAS service request message to the base station through the established RRC connection at step S1005. Accordingly, the base station may receive the RRC setup complete message and the NAS service request message from the terminal. Next, the base station may transmit an RRC reconfiguration message to the terminal at step S1006. Accordingly, the terminal may receive the RRC reconfiguration message from the base station. Next, the terminal may transmit an RRC reconfiguration complete message to the base station at step S1007. The base station may receive the RRC reconfiguration complete message from the terminal.

As such, the terminal may configure bearer information capable of transmitting and receiving data to and from the base station through the RRC reconfiguration procedure according to the allocated radio resources and network resource information. Afterward, the terminal may be allocated PUSCH resources for transmitting uplink data from the base station and transmit uplink data to the base station using the PUSCH resources at step S1008. Accordingly, the base station may receive the uplink data from the terminal. That is, in the idle state, quate a long delay of several tens msec may occur from generation of uplink data until completion of transmission.

Figure 11:
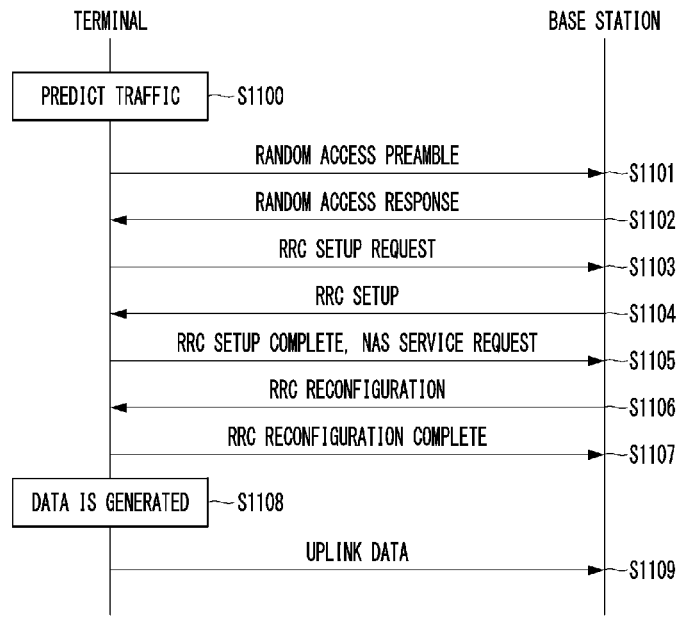
FIG. 11 is a signal flow diagram illustrating a second embodiment of a service request method in a communication system.

FIG. 11 is a signal flow diagram illustrating a second embodiment of a service request method in a communication system.

With reference to FIG. 11, a terminal may be in an idle state. In this state, the terminal may predict uplink traffic at step S1100. As a result, the terminal may predict the generation of uplink data to be transmitted to the base station. When the generation of uplink data to be transmitted to the base station is predicted like this, the terminal may transmit a random access preamble to the base station. Alternatively, when the amount of uplink data to be transmitted to the base station is predicted to be greater than or equal to a predetermined size, the terminal may transmit a random access preamble to the base station. Here, the predetermined size may be, for example, 1000 bytes. Alternatively, when the generation of uplink data to be transmitted to the base station is predicted within a predetermined time period, the terminal may transmit a random access preamble to the base station. Here, the predetermined time may be, for example, 10 msec. Alternatively, when the prediction accuracy of uplink data to be transmitted to the base station is higher than a predetermined percentage, the terminal may transmit a random access preamble to the base station. Here, the predetermined percentage may be, for example, 90%.

Alternatively, i) when the amount of uplink data to be transmitted to the base station is predicted to be equal to or greater than a predetermined size and ii) when the generation of uplink data to be transmitted to the base station is predicted within a predetermined time, the terminal may transmit a random access preamble to the base station. Alternatively, i) when the amount of uplink data to be transmitted to the base station is predicted to be equal to or greater than a predetermined size and ii) when the prediction accuracy of uplink data to be transmitted to the base station is equal to or higher than a predetermined percentage, the terminal may transmit a random access preamble to the base station. Alternatively, i) when the generation of uplink data to be transmitted to the base station is predicted within a predetermined time and ii) when the prediction accuracy of uplink data to be transmitted to the base station is equal to or higher than a predetermined percentage, the terminal may transmit a random access preamble to the base station. Alternatively, when the result of multiplying the amount of uplink data to be transmitted to the base station by the prediction accuracy of the uplink data to be transmitted to the base station is greater than a predetermined size, the terminal may transmit a random access preamble to the base station.

Then, the base station may receive the random access preamble from the terminal. Next, the base station may transmit a random access response message to the terminal at step S1102.

The terminal may receive the random access response message from the base station. Accordingly, the terminal may transmit an RRC setup request message to the base station at step S1103. The base station may receive the RRC set up request message from the terminal. Then, the base station may transmit an RRC setup message to the terminal at step S1104. Accordingly, the terminal may receive the RRC setup message from the base station. As such, the terminal may establish an RRC connection with the base station through the RRC connection establishment procedure.

Afterward, the terminal may transmit an RRC setup completion message and a NAS service request message to the base station through the established RRC connection at step S1105. Accordingly, the base station may receive the RRC setup complete message and the NAS service request message from the terminal. Next, the base station may transmit an RRC reconfiguration message to the terminal at step S1106. Accordingly, the terminal may receive the RRC reconfiguration message from the base station. Next, the terminal may transmit an RRC reconfiguration complete message to the base station at step S1107.

The base station may receive the RRC reconfiguration complete message from the terminal. As such, the terminal may configure bearer information capable of transmitting and receiving data to and from the base station through the RRC reconfiguration procedure according to the allocated radio resources and network resource information. Afterward, the terminal may be allocated PUSCH resources for transmitting uplink data from the base station and transmit, upon generation of uplink data at step S1108, the uplink data to the base station at step S1109 using the resources. Accordingly, the base station may receive the uplink data from the terminal. Accordingly, it is possible to considerably reduce the delay from the generation of uplink data until the completion of transmission in an idle state. In the best case, when actual data is generated at the time when PUSCH resources for transmission of uplink data are allocated, the delay at the terminal from data generation until completion of transmission may be almost eliminated.

Meanwhile, Table 1 below may show service establishment cause information elements included in the RRC setup request message. When uplink data to be transmitted is predicted in the idle state and a service request procedure is performed in advance, the terminal may inform the base station that uplink data is predicted by setting EstablishmentCause for the RRC connection setup procedure to mo-PredictionData. When the service request procedure is performed in advance based on a prediction result for a different EstablishmentCause, the terminal may correspondingly set the EstablishmentCause for the RRC connection establishment procedure to inform the base station that the corresponding cause has been predicted.

TABLE 1

EstablishmentCause ::= ENUMERATED {emergency, highPriorityAccess, mt-Access, mo-Signalling, mo-Data, mo-VoiceCall, mo-VideoCall, mo-SMS, mps-PriorityAccess, mcs-PriorityAccess, mo-PredictedData, spare5, spare4, spare3, spare2, spare1}

Meanwhile, in order to reduce battery consumption of the terminal, in normal cases, when there is no data transmission or reception activity for a predetermined period of time, the network may release the wireless connection of the terminal. In this case, the terminal may transition to the inactive state. The terminal in an inactive state may transition to the active state faster than in the idle state by maintaining the network connection. When uplink traffic is generated in the inactive state, the terminal may establish a wireless connection again through an RRC connection resume procedure, be allocated radio resources from the base station, and transmit and receive data to and from the base station using the network resources maintained without being released.

Figure 12:
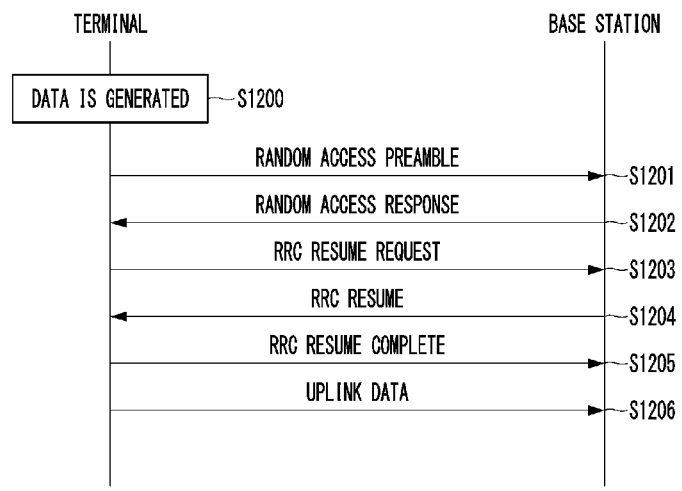
FIG. 12 is a signal flow diagram illustrating a first embodiment of a connection resumption method in a communication system.

FIG. 12 is a signal flow diagram illustrating a first embodiment of a connection resumption method in a communication system.

With reference to FIG. 12, a terminal may be in an inactive state. Uplink data may be generated in the terminal in the inactive state at S1200. Then, the terminal may transmit a random access preamble to a base station at step S1201. Accordingly, the base station may receive the random access preamble from the terminal.

Next, the base station may transmit a random access response message to the terminal at step S1202. The terminal may receive the random access response message from the base station. Accordingly, the terminal may transmit an RRC resume request message to the base station at step S1203. The base station may receive the RRC resume request message from the terminal. Then, the base station may transmit an RRC resume message to the terminal at step S1204. Accordingly, the terminal may receive the RRC resume message from the base station. As such, the terminal may resume the RRC connection with the base station through the RRC connection resume procedure.

Afterward, the terminal may transmit an RRC resume complete message to the base station through the resumed RRC connection at step S1205. Then, the base station may receive the RRC resume complete message from the terminal. Afterward, the terminal may be allocated PUSCH resources for transmitting uplink data from the base station and transmit uplink data to the base station using the PUSCH resources at step S1206. Accordingly, the base station may receive the uplink data from the terminal. That is, in the idle state, quite a long delay of several tens msec may occur from the generation of uplink data until the completion of transmission. Of course, the delay in the inactive state is considerably less than the delay occurring in the idle state.

Figure 13:
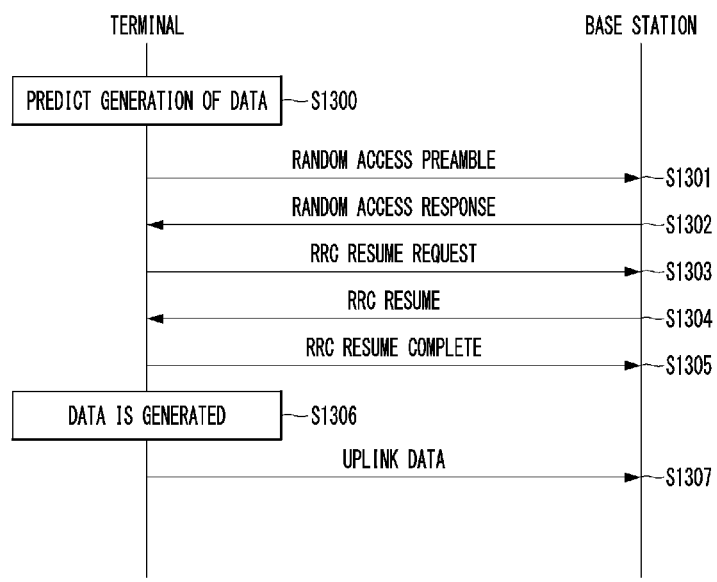
FIG. 13 is a signal flow diagram illustrating a second embodiment of a connection resumption method in a communication system.

FIG. 13 is a signal flow diagram illustrating a second embodiment of a connection resumption method in a communication system.

With reference to FIG. 13, a terminal may be in an inactive state. In this state, the terminal may predict uplink traffic. As a result, the terminal may predict, at step S1300, the generation of uplink data to be transmitted to the base station. When generation of uplink data to be transmitted to the base station is predicted like this, the terminal may transmit a random access preamble to the base station at step S1301. Alternatively, when the amount of uplink data to be transmitted to the base station is predicted to be greater than or equal to a predetermined size, the terminal may transmit a random access preamble to the base station. Here, the predetermined size may be, for example, 1000 bytes. Alternatively, when the generation of uplink data to be transmitted to the base station is predicted within a certain time period, the terminal may transmit a random access preamble to the base station. Here, the predetermined time may be, for example, 10 msec. Alternatively, when the prediction accuracy of uplink data to be transmitted to the base station is higher than a predetermined percentage, the terminal may transmit a random access preamble to the base station. Here, the predetermined percentage may be, for example, 90%.

Alternatively, i) when the amount of uplink data to be transmitted to the base station is predicted to be equal to or greater than a predetermined size and ii) when the generation of uplink data to be transmitted to the base station is predicted within a predetermined time, the terminal may transmit a random access preamble to the base station. Alternatively, i) when the amount of uplink data to be transmitted to the base station is predicted to be equal to or greater than a predetermined size and ii) when the prediction accuracy of uplink data to be transmitted to the base station is equal to or higher than a predetermined percentage, the terminal may transmit a random access preamble to the base station. Alternatively, i) when the generation of uplink data to be transmitted to the base station is predicted within a predetermined time and ii) when the prediction accuracy of uplink data to be transmitted to the base station is equal to or higher than a predetermined percentage, the terminal may transmit a random access preamble to the base station. Alternatively, when the result of multiplying the amount of uplink data to be transmitted to the base station by the prediction accuracy of the uplink data to be transmitted to the base station is greater than a predetermined size, the terminal may transmit a random access preamble to the base station.

Then, the base station may receive the random access preamble from the terminal. Next, the base station may transmit a random access response message to the terminal at step S1302.

The terminal may receive a random access response message from the base station. Accordingly, the terminal may transmit an RRC resume request message to the base station at step S1303. The base station may receive the RRC resume request message from the terminal. Then, the base station may transmit an RRC resume message to the terminal at step S1304. Accordingly, the terminal may receive the RRC resume message from the base station. As such, the terminal may resume the RRC connection with the base station through the RRC connection establishment procedure.

Afterward, the terminal may transmit an RRC resume complete message to the base station through the resumed RRC connection at step S1305. Then, the base station may receive the RRC resume complete message from the terminal. Afterward, the terminal may be allocated PUSCH resources for transmitting uplink data from the base station and transmit, upon generation of uplink data at step S1306, the uplink data to the base station at step S1307 using the resources. Accordingly, the base station may receive the uplink data from the terminal. Accordingly, it is possible to considerably reduce the delay occurring in the terminal in the idle state from the generation of uplink data until the completion of transmission. In the best case, when actual data is generated at the time when PUSCH resources for transmission of uplink data are allocated, the delay at the terminal from data generation until completion of transmission may be almost eliminated.

Meanwhile, Table 2 below may show a resume cause information element included in an RRC resume request message with which the terminal informs the base station of the cause of connection resumption in the RRC connection resume procedure. When uplink data to be transmitted is predicted in the inactive state and an RRC connection resume procedure is performed in advance, the terminal may inform the base station that uplink data is predicted by setting ResumeCause for the RRC connection resume procedure to mo-PredictionData. When the RRC connection resume procedure is performed in advance based on a prediction result for a different ResumeCause, the terminal may correspondingly set the ResumeCause for the RRC connection resume procedure to inform the base station that the corresponding cause has been predicted.

TABLE 2

ResumeCause ::= ENUMERATED {emergency, highPriority Access, mt-Access, mo-Signalling, mo-Data, mo-VoiceCall, mo-VideoCall, mo-SMS, ma-Update, mps-PriorityAccess, mcs-PriorityAccess, mo-PredictedData, spare2, spare3, spare4, spare5}

Meanwhile, in order to reduce battery consumption of the terminal, when there is no data transmission or reception activity for a predetermined period of time, the network may release the network connection and wireless connection of the terminal in normal cases. In this case, the terminal may transition to an idle state. When downlink traffic is generated in the idle state, the network may page the terminal in the idle state through a paging procedure. In this case, the terminal may transmit a NAS service request message to the network to establish a wireless connection again and may be allocated radio and network resources to transmit and receive data.

Figure 14:
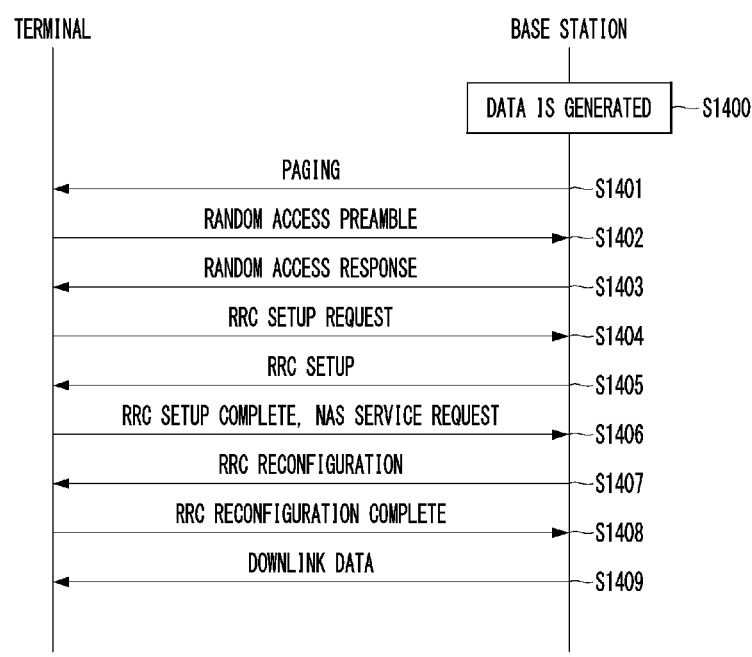
FIG. 14 is a signal flow diagram illustrating a first embodiment of a paging method in a communication system.

FIG. 14 is a signal flow diagram illustrating a first embodiment of a paging method in a communication system.

With reference to FIG. 14, a terminal may be in an idle state. In this state, downlink data may be generated in the base station at step S1400. Then, the base station may transmit a paging message to the terminal at step S1401. The terminal may receive the paging message from the base station. Then, the terminal may transmit a random access preamble to a base station at step S1402. Accordingly, the base station may receive the random access preamble from the terminal.

Next, the base station may transmit a random access response message to the terminal at step S1403. The terminal may receive the random access response message from the base station. Accordingly, the terminal may transmit an RRC setup request message to the base station at step S1404. The base station may receive the RRC setup request message from the terminal. Then, the base station may transmit an RRC setup message to the terminal at step S1405. Accordingly, the terminal may receive the RRC setup message from the base station. As such, the terminal may establish an RRC connection with the base station through the RRC connection establishment procedure.

Afterward, the terminal may transmit an RRC setup completion message and a NAS service request message to the base station through the established RRC connection at step S1406. Accordingly, the base station may receive the RRC setup complete message and the NAS service request message from the terminal. Next, the base station may transmit an RRC reconfiguration message to the terminal at step S1407. Accordingly, the terminal may receive the RRC reconfiguration message from the base station. Next, the terminal may transmit an RRC reconfiguration complete message to the base station at step S1408. The base station may receive the RRC reconfiguration complete message from the terminal.

As such, the terminal may configure bearer information capable of transmitting and receiving data to and from the base station through the RRC reconfiguration procedure according to the allocated radio resources and network resource information. Then, the base station may transmit the downlink data to the terminal at step S1409. Accordingly, the terminal may receive the downlink data from the base station. That is, in the idle state, quate a long delay of several tens msec may occur from generation of downlink data until completion of transmission. Similarly, when downlink data is generated in the inactive state, the network may transmit a paging message through a base station in a paging area where the terminal is located. Upon receipt of the paging message, the terminal may resume the RRC connection with the base station through an RRC connection resume procedure. Afterward, the network may transmit the downlink data to the terminal. That is, in the inactive state, quate a long delay of several tens msec may occur from generation of downlink data until completion of transmission.

Figure 15:
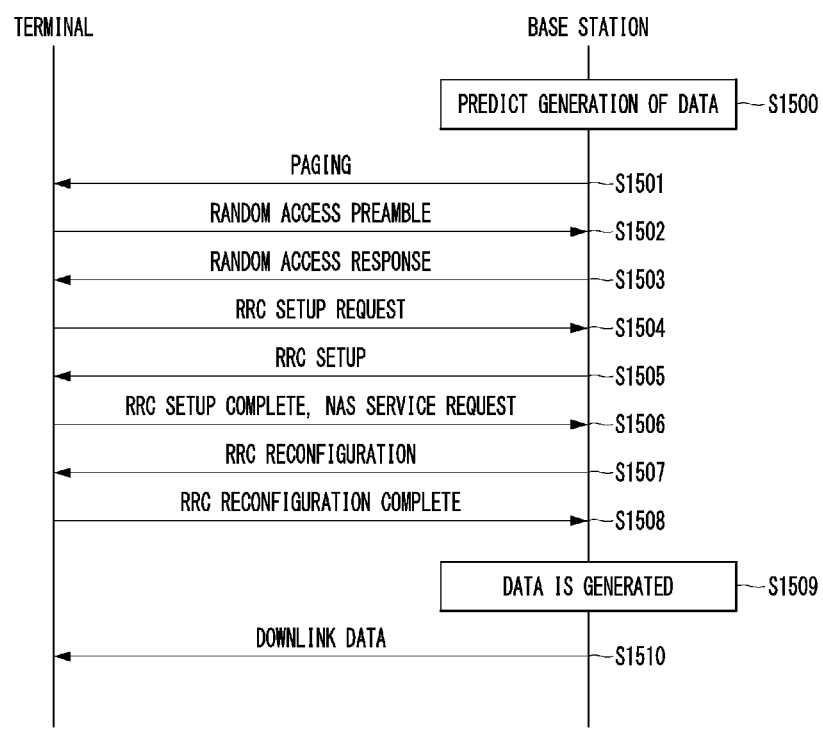
FIG. 15 is a signal flow diagram illustrating a second embodiment of a paging method in a communication system.

FIG. 15 is a signal flow diagram illustrating a second embodiment of a paging method in a communication system.

With reference to FIG. 15, a terminal may be in an idle state. In this state, the base station may predict downlink traffic. As a result, the base station may predict, at step S1500, the generation of downlink data to be transmitted to the terminal. In this case, when the generation of downlink data to be transmitted to the terminal is predicted, the base station may transmit a paging message to the terminal at step S1501. Then, the terminal may receive the paging message from the base station. Alternatively, when the amount of downlink data to be transmitted to the terminal is predicted to be greater than or equal to a predetermined size, the base station may transmit a paging message to the terminal. Here, the predetermined size may be, for example, 1000 bytes. Alternatively, when the generation of downlink data to be transmitted to the terminal is predicted within a predetermined time period, the base station may transmit a paging message to the terminal. Here, the predetermined time may be, for example, 10 msec. Alternatively, when the prediction accuracy of downlink data to be transmitted to the terminal is higher than a predetermined percentage, the base station may transmit a paging message to the terminal. Here, the predetermined percentage may be, for example, 90%.

Alternatively, i) when the amount of downlink data to be transmitted to the terminal is predicted to be equal to or greater than a predetermined size and ii) when the generation of downlink data to be transmitted to the terminal is predicted within a predetermined time, the base station may transmit a paging message to the terminal. Alternatively, i) when the amount of downlink data to be transmitted to the terminal is predicted to be equal to or greater than a predetermined size and ii) when the prediction accuracy of downlink data to be transmitted to the terminal is equal to or higher than a predetermined percentage, the base station may transmit a paging message to the terminal. Alternatively, i) when the generation of downlink data to be transmitted to the terminal is predicted within a predetermined time and ii) when the prediction accuracy of downlink data to be transmitted to the terminal is equal to or higher than a predetermined percentage, the base station may transmit a paging message to the terminal. Alternatively, when the result of multiplying the amount of downlink data to be transmitted to the terminal by the prediction accuracy of the downlink data to be transmitted to the terminal is greater than a predetermined size, the base station may transmit a paging message to the terminal.

Then, the terminal may transmit a random access preamble to a base station at step S1502. The base station may receive the random access preamble from the terminal. Next, the base station may transmit a random access response message to the terminal at step S1503. The terminal may receive the random access response message from the base station. Accordingly, the terminal may transmit an RRC setup request message to the base station at step S1504. The base station may receive the RRC setup request message from the terminal. Then, the base station may transmit an RRC setup message to the terminal at step S1505. Accordingly, the terminal may receive the RRC setup message from the base station. As such, the terminal may establish an RRC connection with the base station through the RRC connection establishment procedure.

Afterward, the terminal may transmit an RRC setup completion message and a NAS service request message to the base station through the established RRC connection at step S1506. Accordingly, the base station may receive the RRC setup complete message and the NAS service request message from the terminal. Next, the base station may transmit an RRC reconfiguration message to the terminal at step S1507. Accordingly, the terminal may receive the RRC reconfiguration message from the base station. Next, the terminal may transmit an RRC reconfiguration complete message to the base station at step S1508.

The base station may receive the RRC reconfiguration complete message from the terminal. As such, the terminal may configure bearer information capable of transmitting and receiving data to and from the base station through the RRC reconfiguration procedure according to the allocated radio resources and network resource information. Thereafter, when downlink data is generated at step S1509, the base station may transmit the downlink data to the terminal at step S1510. Accordingly, the terminal may receive the downlink data from the base station.

Accordingly, it is possible to considerably reduce the delay from generation of downlink data until completion of transmission in the idle state. In the best case, when actual data is generated at the time when the RRC connection reconfiguration procedure is completed, the delay at the base station from data generation until completion of transmission may be almost eliminated.

Meanwhile, Table 3 below may show a paging message transmitted by a base station. In the paging method, an early paging flag may be set in a paging message to inform the terminal that the paging message is transmitted as a result of downlink data prediction. Upon receipt of the paging message, the terminal may perform a service request procedure in advance or ignore the corresponding paging. When the terminal performs the service request procedure in advance, downlink data delay may be reduced, but the battery consumption of the terminal may be increased.

Conversely, the terminal may ignore the corresponding paging. In this case, when actual downlink data is generated, the network may page the terminal in the idle or inactive state by initiating the paging procedure again. The terminal may transmit a NAS service request message to the network to establish a wireless connection again and may be allocated radio and network resources to transmit and receive data.

In this case, although possible to minimize the battery consumption of the terminal, it may be difficult to expect a downlink delay reduction effect. In addition, the base station may include a data-time-after-paging information element in the paging message for use in determining whether to receive or ignore paging. The data-time-after-paging information may indicate a predicted time until downlink data is transmitted after paging.

corresponding base station to be able to transmit a paging message when downlink data is generated.

Table 4 below may show a service establishment cause information element in which the terminal informs the base station of the cause of connection establishment in the RRC connection establishment procedure. When capable of receiving a paging message caused by downlink data prediction in the idle state and initiating a service request procedure in advance, the terminal may inform the base station that downlink data is predicted by setting EstablishmentCause for the RRC connection establishment procedure to mt-PredictionAccess. When performing a service request procedure in advance based on a different cause, the terminal may properly set the EstablishmentCause for an RRC connection establishment procedure to notify the base station of the corresponding cause.

Similarly, when capable of receiving a paging message caused by downlink data prediction in the RRC connection resume procedure and initiating the RRC connection resume procedure in advance, the terminal may inform the base station that downlink data is predicted by setting ResumeCause for the RRC connection resume procedure to mt-PredictionAccess.

TABLE 4

EstablishmentCause ::= ENUMERATED {
emergency. highPriorityAccess, mt-Access, mo-Signalling, mo-Data, mo-VoiceCall, mo-VideoCall, mo-SMS, mps-PriorityAccess, mcs-PriorityAccess, mo-PredictedData, mt-PredictionAcess, spare4, spare3, spare2, spare1}

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store

TABLE 3

```
Paging ::=                    SEQUENCE {
    pagingRecordList              PagingRecordList OPTIONAL, -- Need N
    lateNonCriticalExtension         OCTET STRING    OPTIONAL,
    nonCriticalExtension          SEQUENCE{ }    OPTIONAL
}
PagingRecordList ::=   SEQUENCE (SIZE(1..maxNrofPageRec)) OF PagingRecord
    PagingRecord ::=              SEQUENCE {
    ue-Identity               PagingUE-Identity,
    accessType                ENUMERATED {non3GPP} OPTIONAL, -- Need N
    earlyPaging               BLOONEN         OPTIONAL, -- Need N
    ...
}
PagingUE-Identity ::= CHOICE {
    ng-5G-S-TMSI ,
    fullI-RNTI   I-RNTI-Value,
    ...
}
```

Alternatively, the terminal may not perform a service request procedure, perform only a random access procedure, or perform an RRC connection setup procedure and immediately release the connection. In this way, the terminal may notify a base station of its location in order for only the and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a terminal in a communication system, the method comprising:
    predicting traffic using a traffic prediction function configured according to traffic prediction configuration information;
    determining whether a traffic prediction result satisfies a reporting condition;
    transmitting, in response to the traffic prediction result satisfying the reporting condition, a scheduling request to a base station;
    receiving a first physical uplink shared channel (PUSCH) resource allocation information generated based on the scheduling request from the base station;
    transmitting a buffer prediction status report including the traffic prediction result to the base station using first resources allocated by the first PUSCH resource allocation information;
    receiving a seconds PUSCH resource allocation information generated based on the buffer prediction status report; and
    transmitting data to the base station using second resources allocated by the second PUSCH resource allocation information.

2. The method of claim 1, wherein the traffic prediction result comprises at least one of amount of uplink traffic, predicted generation time of uplink traffic, or prediction accuracy of uplink traffic.

3. The method of claim 1, wherein the reporting condition is at least one of a condition in which amount of uplink traffic is equal to or greater than a predetermined size, a condition in which predicted generation time of uplink traffic is within a predetermined period of time, or a condition in which prediction accuracy of uplink traffic is equal to or greater than a predetermined percentage.

4. The method of claim 1, further comprising:
    receiving traffic prediction model information for each traffic prediction model identified by a traffic prediction model identifier from the base station;
    receiving traffic prediction configurating information including the traffic prediction model identifier from the base station; and
    configuring the traffic prediction function with a traffic prediction model identified by the traffic prediction model identifier.

5. The method of claim 1, further comprising:
    receiving, from the base station, model feedback configuration information requesting transmission of a model feedback signal when a different between a measurement result and a prediction result at a predetermined time is equal to or greater than a threshold value;
    obtaining the measurement result by measuring traffic at the predetermined time;
    obtaining the prediction result by predicting a traffic at the predetermined time; and
    transmitting the model feedback signal to the base station in response to the measurement result and the prediction result being equal to or greater than the threshold value.

6. The method of claim 5, wherein transmitting the model feedback signal to the base station in response to the measurement result and the prediction result being equal to or greater than the threshold value comprises:
    transmitting, in response to the measurement result and the prediction result being equal to or greater than the threshold value, an information availability indicator indicating the presence of a model feedback report to the base station;
    receiving a model feedback report request from the base station; and
    transmitting the model feedback signal including information on the measurement result and information on the prediction result to the base station.

7. The method of claim 1, further comprising:
    receiving a traffic prediction activation command from the base station; and
    activating the traffic prediction function according to the traffic prediction activation command.

8. The method of claim 1, further comprising:
    checking a state of the terminal upon prediction of generation of traffic according to the traffic prediction result;
    establishing, in response to the state being an idle state, a radio resource control (RRC) connection with the base station through an RRC connection establishment procedure; and
    resuming, in response to the state being inactive state, an RRC connection with the base station through an RRC connection resume procedure with the base station.

9. An operation method of a base station in a communication system, the method comprising:
    transmitting traffic prediction model information for each traffic prediction model identified by a traffic prediction model identifier to a terminal;
    generating traffic prediction configuration information including the traffic prediction model identifier;
    transmitting the traffic prediction configuration information to the terminal;
    receiving from the terminal a scheduling request generated based on a traffic prediction result predicted according to the traffic prediction configuration information;

allocating first physical uplink shared channel (PUSCH) resources based on the scheduling request;

transmitting allocation information on the first PUSCH resources to the terminal; and receiving a buffer prediction status report through the first PUSCH resources.

10. The method of claim 9, further comprising:

receiving a buffer prediction status report including a traffic prediction result from the terminal;

allocating second PUSCH resources based on the buffer prediction status report;

transmitting allocation information on the PUSCH resources to the terminal; and receiving data through the second PUSCH resources from the terminal.

11. The method of claim 9, further comprising:

predicting downlink traffic using a traffic prediction model;

checking a state of the terminal upon prediction of generation of the downlink traffic;

transmitting a paging message to the terminal when the state is an idle state or an inactive state; and initiating a radio resource control (RRC) connection establishment or RRC resume procedure with the terminal.

12. A terminal comprising:

a processor configured to control the terminal to;

predict traffic using a traffic prediction function configured according to traffic prediction configuration information;

determine whether a traffic prediction result satisfies a reporting condition;

transmit, in response to the traffic prediction result satisfying the reporting condition, a scheduling request to a base station;

receive a first physical uplink shared channel (PUSCH) resource allocation information generated based on the scheduling request from the base station;

transmit a buffer prediction status report including the traffic prediction result to the base station using first resources allocated by the first PUSCH resource allocation information;

receive a second PUSCH resource allocation information generated based on the buffer prediction status report; and transmit data to the base station using second resources allocated by the second PUSCH resource allocation information.

13. The terminal of claim 12, wherein the traffic prediction result comprises at least one of amount of uplink traffic, predicted generation time of uplink traffic, or prediction accuracy of uplink traffic.

14. The terminal of claim 12, wherein the reporting condition is at least one of a condition in which amount of uplink traffic is equal to or greater than a predetermined size, a condition in which predicted generation time of uplink traffic is within a predetermined period of time, or a condition in which prediction accuracy of uplink traffic is equal to or greater than a predetermined percentage.

15. The terminal of claim 12, wherein the processor is further configured to control the terminal to receive, from the base station, model feedback configuration information requesting transmission of a model feedback signal when a different between a measurement result and a prediction result at a predetermined time is equal to or greater than a threshold value, obtain the measurement result by measuring traffic at the predetermined time, obtain the prediction result by predicting a traffic at the predetermined time, and transmit the model feedback signal to the base station in response to the measurement result and the prediction result being equal to or greater than the threshold value.

16. The method of claim 12, wherein the processor is further configured to control the terminal to check a state of the terminal upon prediction of generation of traffic according to the traffic prediction result, establish, in response to the state being an idle state, a radio resource control (RRC) connection with the base station through an RRC connection establishment procedure, and resuming, in response to the state being inactive state, an RRC connection with the base station through an RRC connection resume procedure with the base station.

* * * * *